United States Patent [19]
Nakatani

[11] Patent Number: 5,267,253
[45] Date of Patent: Nov. 30, 1993

[54] PULSED LASER

[75] Inventor: Hajime Nakatani, Amagasaki, Japan

[73] Assignee: Mitsubishi Denki Kabushiki Kaisha, Tokyo, Japan

[21] Appl. No.: 888,614

[22] Filed: May 27, 1992

[30] Foreign Application Priority Data

May 27, 1991 [JP] Japan .................................. 3-121006

[51] Int. Cl.$^5$ .............................................. H01S 3/00
[52] U.S. Cl. ......................................... 372/38; 372/25
[58] Field of Search ...................... 372/38, 83, 82, 87, 372/25

[56] References Cited

U.S. PATENT DOCUMENTS

| 4,722,091 | 1/1988 | Taylor | 372/83 |
| 4,975,921 | 12/1990 | Rothe . | |
| 5,138,622 | 8/1992 | Friede et al. | 372/83 |

OTHER PUBLICATIONS

Patent Abstracts of Japan, vol. 14, No. 145 (E-905) (4088), Mar. 19, 1990, and JP-A-2-007-483, Jan. 11, 1990, S. Kawamura, "Discharge Type Excimer Laser".
Patent Abstracts of Japan, vol. 11, No. 113 (E-497) (2560), Apr. 9, 1987, and JP-A-61-260-690, Nov. 18, 1986, M. Kimura et al., "Gas Laser Oscillator".
Patent Abstracts of Japan, vol. 13, No. 181 (E-750) (3529), Apr. 27, 1989, and JP-A-1-007-579, Jan. 11, 1989, K. Hotta et al., "Rare Gas Halide Excimer Laser".
Patent Abstracts of Japan, vol. 11, No. 314 (E-549) (2761), Oct. 13, 1987, and JP-A-62-108-588, May 19, 1987, S. Takagi et al., "Charge and Discharge Device".
Review of Scientific Instruments, vol. 56, No. 11, Nov. 1985, pp. 2018-2020, T. Shimada et al., "An All Solid-State Magnetic Switching Exciter for Pumping Excimer Lasers".

Primary Examiner—Rodney B. Bovernick
Assistant Examiner—Robert E. Wise
Attorney, Agent, or Firm—Oblon, Spivak, McClelland, Maier & Neustadt

[57] ABSTRACT

A pulsed laser according to the present invention comprises a charge terminal, mutually-opposing first and second main discharge electrodes, a pulse generation capacitor connected between the first main electrode and the charge terminal, a plurality of peaking capacitors connected in parallel between the first and second main discharge electrodes, and a plurality of diodes connected in parallel with the plurality of peaking capacitors and oriented to suppress reverse-bias components of main discharge current flowing between the first and second main discharge electrodes. Thereby, reverse current flowing between the first and second main discharge electrodes can be minimized without sacrificing laser oscillation efficiency.

22 Claims, 11 Drawing Sheets

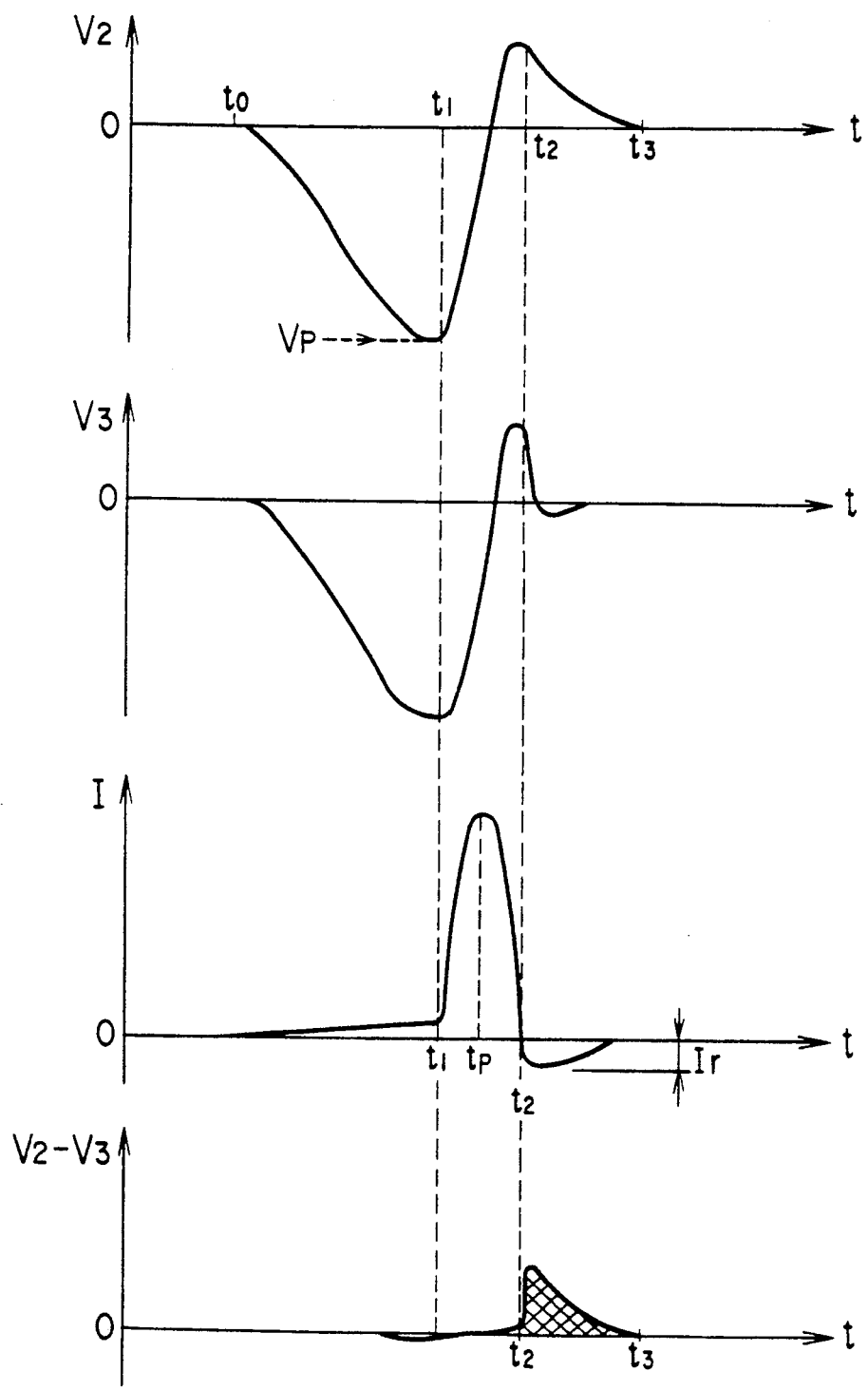

PULSED LASER

BACKGROUND OF THE INVENTION

1. Field of the Invention

The present invention relates to a pulsed laser, or more particularly, to an excitation circuit for a laser.

2. Description of the Related Art

FIG. 13 is a circuit diagram showing an excitation circuit for an excimer laser or a conventional pulsed laser disclosed, for example, in "Actualities of Shortwave Laser Technologies" furnished in Technological Report of the Association of Electricity. Part II, No. 217, p. 5. In FIG 13, 1 and 2 are a pair of mutually-opposing main discharge electrodes. 3 denotes a peaking capacitor connected in parallel with the main discharge electrodes 1 and 2. 4 denotes a pulse generation capacitor. One terminal of the pulse generation capacitor 4 is connected to the main discharge electrode 1. 5 denotes a switch connected between other terminal of the pulse generation capacitor 4 and the main discharge electrode 2. In this example of prior art, a thyratron is employed for the switch 5. 6 represents a charge reactor connected in parallel with the peaking capacitor 3. Then, 7 is a charge terminal connected to other terminal of the pulse generation capacitor 4.

Next, the operations of a conventional excitation circuit will be described in conjunction with FIG. 14 showing waveforms representing voltage and current in components. When positive high voltage is supplied to a charge terminal 7, a pulse generation capacitor 4 is charged through a charge reactor 6. When a switch 5 closes at a time $t_0$, the charge stored in the pulse generation capacitor 4 is delivered to a peaking capacitor 3. At a time $t_1$, discharge starts between main discharge electrodes 1 and 2. For an excimer laser, main discharge must be preceded by preliminary ionization discharge. The electrodes and circuits for preliminary ionization discharge will not be described. After discharge starts, the peaking capacitor 3 feeds energy to a discharge induced between the main discharge electrodes 1 and 2. This causes the laser to oscillate. For the excimer laser or other laser having low discharge resistance (for example, 0.2 ohms), voltage across the peaking capacitor 3 represents an oscillatory wave. A voltage Vr of reverse polarity developed at a time $t_2$ as shown in FIG. 14.

As described above, voltage of reverse polarity develops across the peaking capacitor 3. This reverse main discharge current (Ir in FIG. 14). As a result, a luminescent spot on which discharge concentrates is likely to occur in the surfaces of the main discharge electrodes 1 and 2. Consequently, the surfaces of the main discharge electrodes are heated in spots to evaporate. This shortens the service lives of the electrodes 1 and 2. In particular, when oscillation is repeated at a high speed, this luminescent spot occurs frequently. This accelerates exhaustion of the electrodes and cripples uniform discharge. Eventually, laser output energy per pulse deteriorates. The reverse cycle of the aforesaid main discharge current I is as short as 30 ns. No measures have taken over electric circuitry in the past.

SUMMARY OF THE INVENTION

The object of the present invention is to solve the aforesaid problems or to provide a pulsed laser capable of extending the service life of an electrode and oscillating repeatedly at a high speed.

A pulsed laser according to the present invention comprises a charge terminal, mutually-opposing first and second main discharge electrodes, a pulse generation capacitor connected between the first main electrode and the charge terminal, a plurality of peaking capacitors connected in parallel between the first and second main discharge electrodes, and a plurality of diodes connected in parallel with the plurality of peaking capacitors and oriented to suppress reverse-bias components of main discharge current flowing between the first and second main discharge electrodes.

BRIEF DESCRIPTIO OF THE DRAWINGS

FIG. 5 shows signal waveforms representing the operations of the second embodiment shown in FIG. 4a;

DESCRIPTION OF THE PREFERRED EMBODIMENTS

Embodiments of the present invention will be described in conjunction with the appended drawings.

First Embodiment

Figure 1:
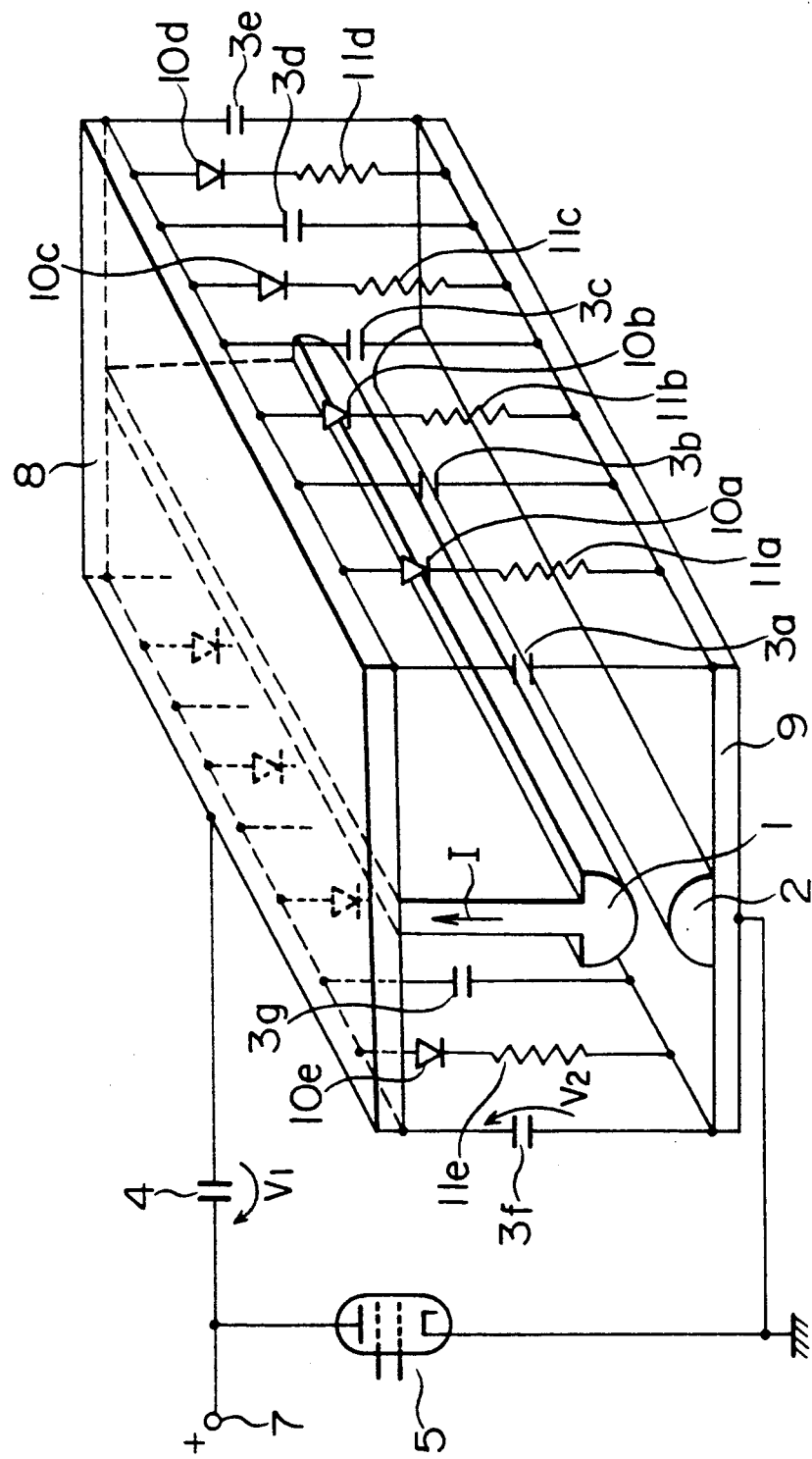
FIG. 1 is a three-dimensional circuit diagram showing a pulsed laser according to the first embodiment of the present invention.

In FIG. 1, a pair of rectangular conductor plates 8 and 9 is arranged in parallel. Main discharge electrodes 1 and 2 are mounted along the longitudinal center lines on the mutually-opposing surfaces of the conductor plates 8 and 9 respectively. Multiple peaking capacitors 3a to 3g are connected between the side margins of the conductor plates 8 and 9. These peaking capacitors 3a to 3g are sporadically arranged in the longitudinal directions of the conductor plates 8 and 9. In addition, the ends of multiple diodes 10a to 10e are connected sporadically to the side margin of the conductor plate 8 in the longitudinal direction of the conductor plate 8. Resistors 11a to 11e are connected between other ends of the diodes 10a to 10e and the side margin of the conductor plate 9. Specifically, the series combinations of the diodes 10a to 10e and the associated resistors 11a to 11e are connected in parallel with the peaking capacitors 3a to 3g. The diodes 10a to 10e are oriented so that they will not conduct the charging currents of the peaking capacitors 3a to 3g.

Moreover, a pulse generating capacitor 4 is connected between the conductor plate 8 and a charge terminal 7. A switch 5 such as a thyratron is connected between the charge terminal 7 and conductor plate 9.

Figure 2:
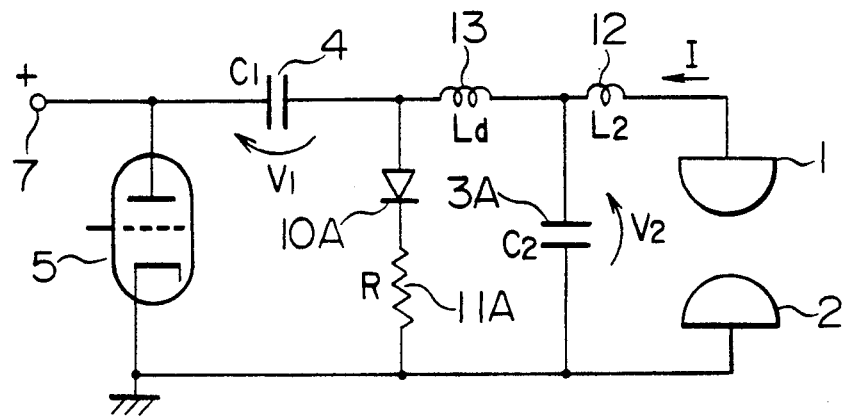
FIG. 2 is a circuit diagram showing the first embodiment.

FIG. 2 shows an equivalent circuit of the three-dimensional circuit of FIG. 1. A peaking capacitor 3A represents peaking capacitors 3a to 3g connected in parallel. Diodes 10a to 10e and resistors 11a and 11e are represented as a diode 10A and a resistor 11A respectively.

Circuit constants for this embodiment are set as follows: the capacitance $C_2$ of the peaking capacitor 3A is set to 10 nF, and the resistance R of the resistor 11A, 1 ohm. 12 denotes a stray inductance $L_2$ of a closed loop made up of the peaking capacitor 3A and the main discharge electrodes 1 and 2, which is set to 6 nH. 13 denotes a stray inductance Ld of a closed loop made up of the peaking capacitor 3A, diode 10A, and resistance 11A, which is set to 10 nH.

Figure 3:
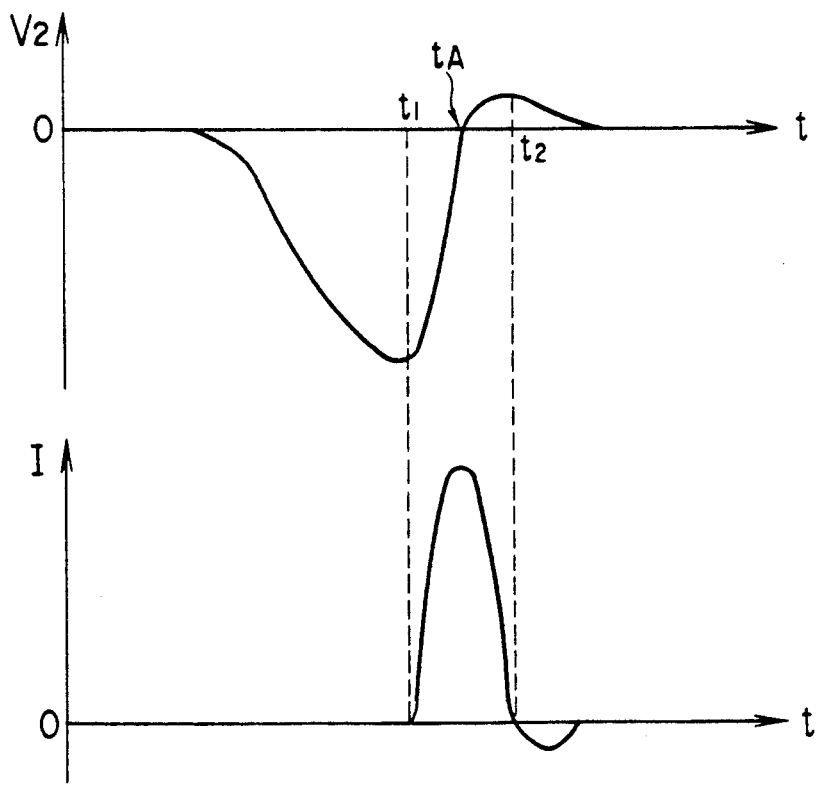
FIG. 3 shows a signal waveform representing the operations of the first embodiment.

Next, the operations will be described. When positive high voltage is supplied to a charge terminal 7, a pulse generation capacitor 4 is charged through a diode 10A and a resistor 11A. FIG. 3 shows time-sequential changes of a voltage $V_2$ across a peaking capacitor 3A and a main discharge current I after a switch 5 closes. A discharge develops between main discharge electrodes 1 and 2 at a time $t_1$. After a time $t_4$, the voltage $V_2$ across the peaking capacitor 3A reverses slightly. Voltage of reverse polarity does not disappear completely, because the diode 10A itself has a stray capacitance that causes a response time lag. When a diode is employed for a discharge excitation pulsed laser in which high voltage is supplied, the time lag becomes as long as 10 to 50 ns. As for an excimer laser or other laser characteristic of a short discharge cycle, the time lag is too long to be ignored. For example, in the first embodiment, the discharge cycle $T_1$ is as short as that given by the formula below.

$$T_1 = 2\pi \sqrt{L_2C_2} = 49 \text{ ns}$$

In this invention, in an effort to minimize voltage of reverse polarity developed in a peaking capacitor 3A, multiple series combinations of diodes and resistors are arranged sporadically in the longitudinal directions of main discharge electrodes 1 and 2 and connected in parallel with peaking capacitors. Thus, a stray inductance Ld of an inductance 13 is reduced so that a charge of reverse polarity of the peaking capacitor 3A will pass through a diode 10A quickly to flow into a resistor 11A. As a result, a reverse-bias component of main discharge current I shown in FIG. 3 has become smaller than that in prior art.

When the stray inductance Ld of the inductance 13 markedly exceeds the stray inductance $L_2$ of an inductance 12, even if a high-speed response element is used as the diode 10A, the stray inductance of the inductance 13 causes a time lag. The diode 10A and resistor 11A fail to absorb the charge of reverse polarity of the peaking capacitor 3A efficiently. In this embodiment, a closed loop made up of the diode 10A, resistor 11A, and peaking capacitor 3A has a cycle determined by the formula below.

$$T_2 = 2\pi \sqrt{LdC_2} = 63 \text{ ns}$$

The $T_2$ value is almost the same as $T_3$ below or a value of a cycle of a closed loop made up of the peaking capacitor 13, and the main discharge electrodes 1 and 2.

$$T_3 = 2\pi \sqrt{L_2C_2} = 49 \text{ ns}$$

With this cycle, the equivalent resistance of the diode 10A is 1 ohm. When the closed loop made up of the peaking capacitor 3A, diode 10A, and resistor 11A vibrates outstandingly, the voltage $V_2$ of the peaking capacitor 3A fluctuates to cause an arc discharge. Therefore, the equivalent resistance r of the closed loop must be specified so that it will not be markedly smaller than a resistance satisfying the critical condition below.

$$C_2r^2/4Ld = 1 \tag{1}$$

In this embodiment, r is set to 2 ohms (= diode resistance + R), $C_2$, 10 nF, and Ld, 10 nH. The resistance R of the resistor 11A is specified to meet the critical condition. When the equivalent resistance of the diode 10A is high, the diode 10A plays the role of the resistor 11A. Therefore, the resistor 11A becomes unnecessary.

Second Embodiment

Figure 4A:
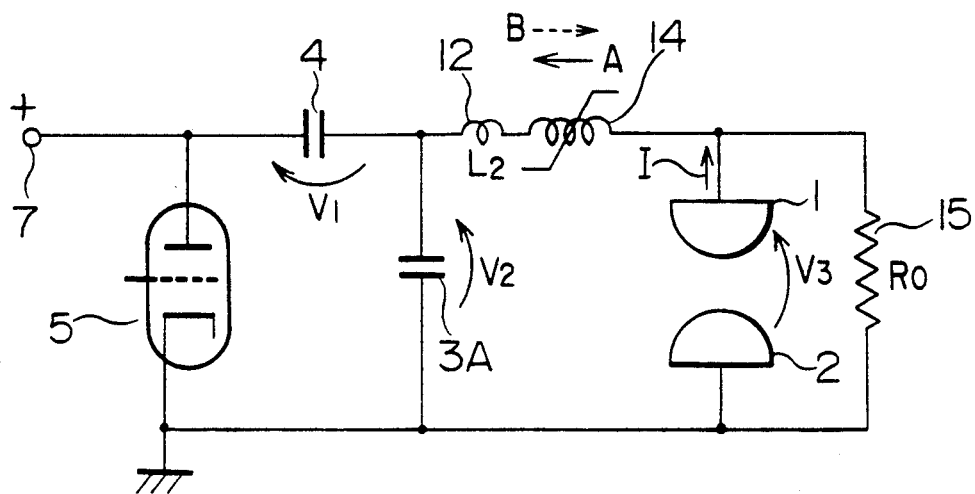
FIGS. 4a, 4b and 4c are circuit diagrams showing variations of the second embodiment of the present invention.
Figure 6:
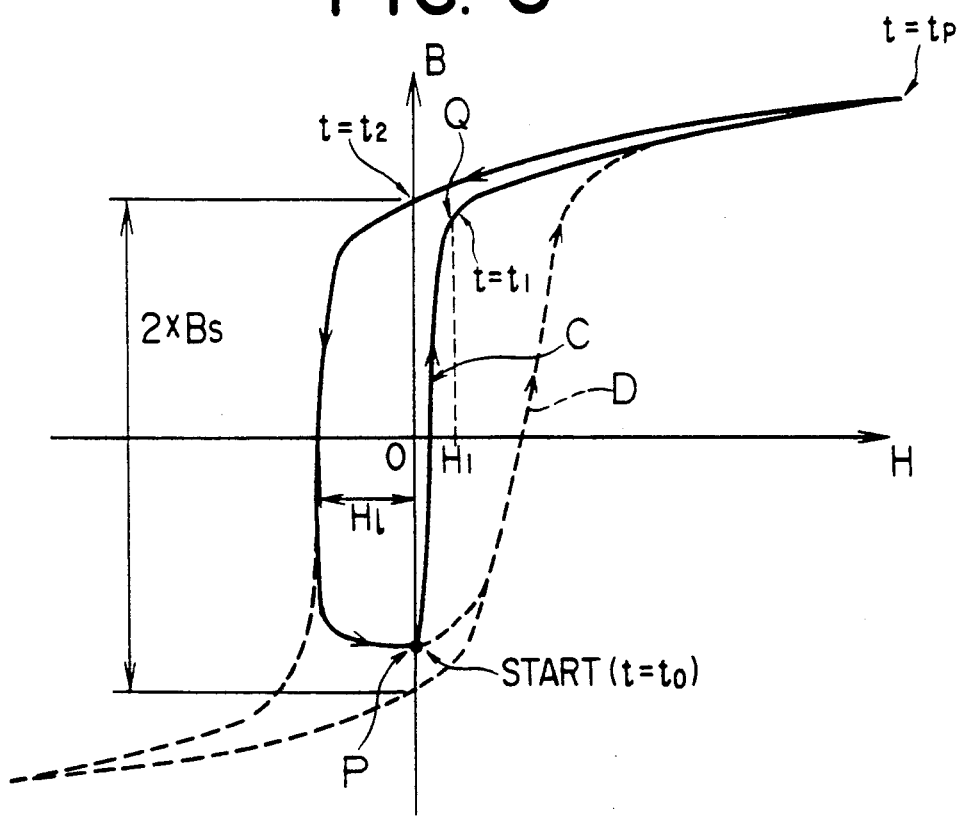
FIG. 6 shows a characteristic curve representing the operation of a saturable reactor in the second embodiment shown in FIG. 4a FIG. 7 is a three-dimensional circuit diagram showing part of the second embodiment shown in FIG. 4a FIG. 8 is a plan view showing a variant of the second embodiment.
Figure 14:
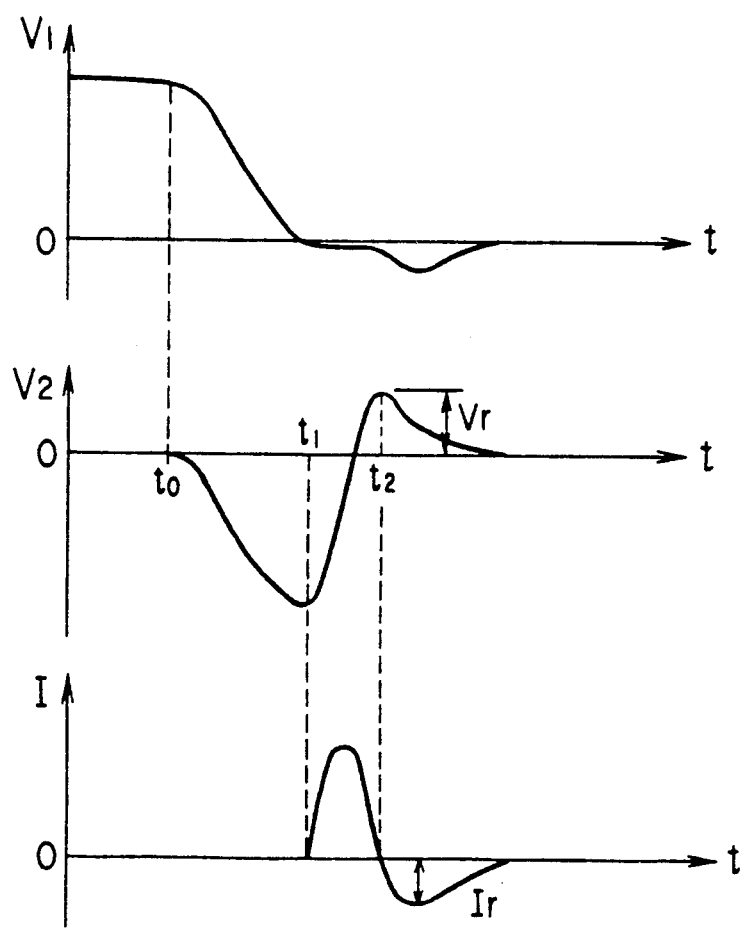
FIG. 14 shows signal waveforms representing the operations of the pulsed laser shown in FIG. 13.

The second embodiment of the present invention will be described in conjunction with the circuit diagram of FIGS. 4a, 4b and 4c. In FIG. 4a, 14 denotes a saturable reactor connected between a main discharge electrode 1 and a peaking capacitor 3A. 15 is a saturable reactor stabilization circuit element, which is connected between main discharge electrodes 1 and 2. In this embodiment, a resistor (with resistance $R_0$) is employed as the saturable reactor stabilization circuit element 15. FIG. 5 shows time-sequential changes of a voltage $V_2$ across the peaking capacitor 3A, a voltage $V_3$ between the main discharge electrodes 1 and 2, a main discharge current I, and $V_2-V_3$. In $t_0 \leq t \leq t_1$, the peaking capacitor 3A is energized. Then, current flows into the saturable reactor 14 via the resistor 15. That is to say, the saturable reactor 14 saturates with current flowing in an arrow A direction shown in FIG. 4a. FIG. 6 shows the B-H curve of the saturable reactor 14, explaining the saturation. By the start of main discharge, the state of the saturable reactor 14 changes from a state represented as a point P on the B-H curve of FIG. 6 to a state represented as the vicinity of a point Q. A main discharge develops after a time $t_1$, causing a main discharge current I to reach its peak at a time $t_p$. The main discharge current I reverses after a time $t_2$. A reverse-bias current does not disappear completely because of the leakage current of the saturable reactor 14. As shown in FIG. 5, the reverse current grows to a maximum of Ir. The value Ir varies depending on the frequency at which the saturable reactor 14 operates. For an excimer laser which is subject to high-speed response, the value H1 in FIG. 6 increases. Eventually, the current Ir becomes too high to be ignored.

In the second embodiment, the saturation magnetic flux Bs and cross-sectional area S of the saturable reactor 14 are specified so that after discharge starts, the saturable reactor 14 will not saturate with current flowing in a direction indicated with a dashed-line arrow B in FIG. 4. That is to say:

$$2 \times Bs \times S > N \times \int_{t2}^{t3} (V_2 - V_3) \times dt \qquad (2)$$

In this embodiment, the number of turns N is set to 1. The integral term on the right side represents the area of a shaded area created with a $V_2$-$V_3$ curve of FIG. 5.

Before discharge starts, the saturable reactor 14 must be in the state represented as a saturation start point Q. To attain this state, the resistance of the resistor 15 serving as an saturable reactor stabilization circuit element must be a value given by the following formula:

$$R_0 \leqq V_p \times N/H_l \times l \qquad (3)$$

where, $V_p$ is a voltage $V_2$ of the peaking capacitor 3A immediately before discharge starts, N, the number of turns of the saturable reactor 14, $H_l$, a value H of a saturation start point (H value at the point Q in FIG. 6) of the saturable reactor 14, and l, a magnetic path length of the saturable reactor 14.

When a resistor 15 is connected across a peaking capacitor 3A instead of between main discharge electrodes 1 and 2, which is not shown, a saturable reactor 14 starts up in the state represented as a point P in FIG. 6. After main discharge starts ($t \geqq t_1$), the state of the saturable reactor 14 varies according to a curve D indicated with a dashed line and duly reaches saturation. The saturable reactor 14 does not change its state according to the solid line or curve C. This is because main discharge current has as short a half cycle as about 25 ns; that is, a high frequency. Therefore, the saturable reactor 14 cannot respond to the frequency. This increases a circuit loss and decrease a laser output. Therefore, the saturable reactor stabilization circuit element 15 should be connected between the main discharge electrodes 1 and 2.

Figure 4B:
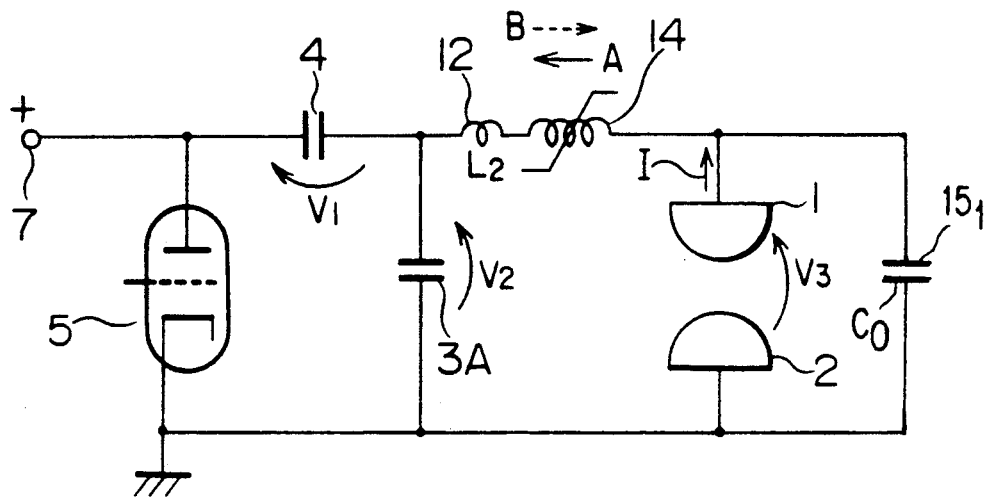
Figure 4C:
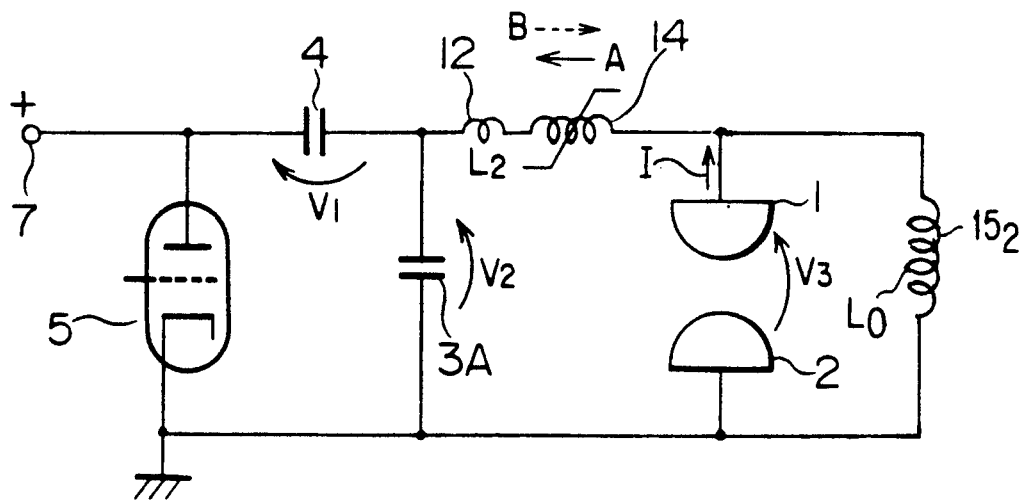

A capacitor $15_1$ having a capacitance $C_0$ as shown in FIG. 4b, reactor $15_2$ having an inductance $L_0$ as shown in FIG. 4c, or other circuit element may be employed as the saturable reactor stabilization circuit element 15 instead of a resistor. However, the capacitor $15_1$ or reactor $15_2$ is an energy storage element. Therefore, as a peaking capacitor 3A develops voltage of reverse polarity to deteriorate discharge, so the capacitor or reactor affects discharge adversely. Therefore, the capacitance $C_0$ or reactance $L_0$ of the capacitor or reactor should be set to the values given by the expressions below.

$$L_0 = \left\{ (N/H_1 \times 1) \times \int_0^{t_1} V_2 dt \right\} \times (0.5 \text{ to } 1.0) \qquad (4)$$

$$C_o = (H_1 \times 1/N) \times \qquad (5)$$

(maximum quotient of $dV_2/dt$ within $0 \leqq t \leqq t_1)^{-1} \times (1.0$ to $2.0)$ When a coefficient is 1.0 and t is $t_1$, the formula (4) or (5) provides a value at a saturation start point or point Q. The coefficient ranges from 0.5 to 1.0 or 1.0 to 2.0, wherein the maximum is a double of the minimum. This ensures stable operation despite the differences of operating parameters or of constants of an employed material.

Instead of the saturable reactor stabilization element $15_2$, a secondary winding may be added to a saturable reactor 14.

Figure 7:
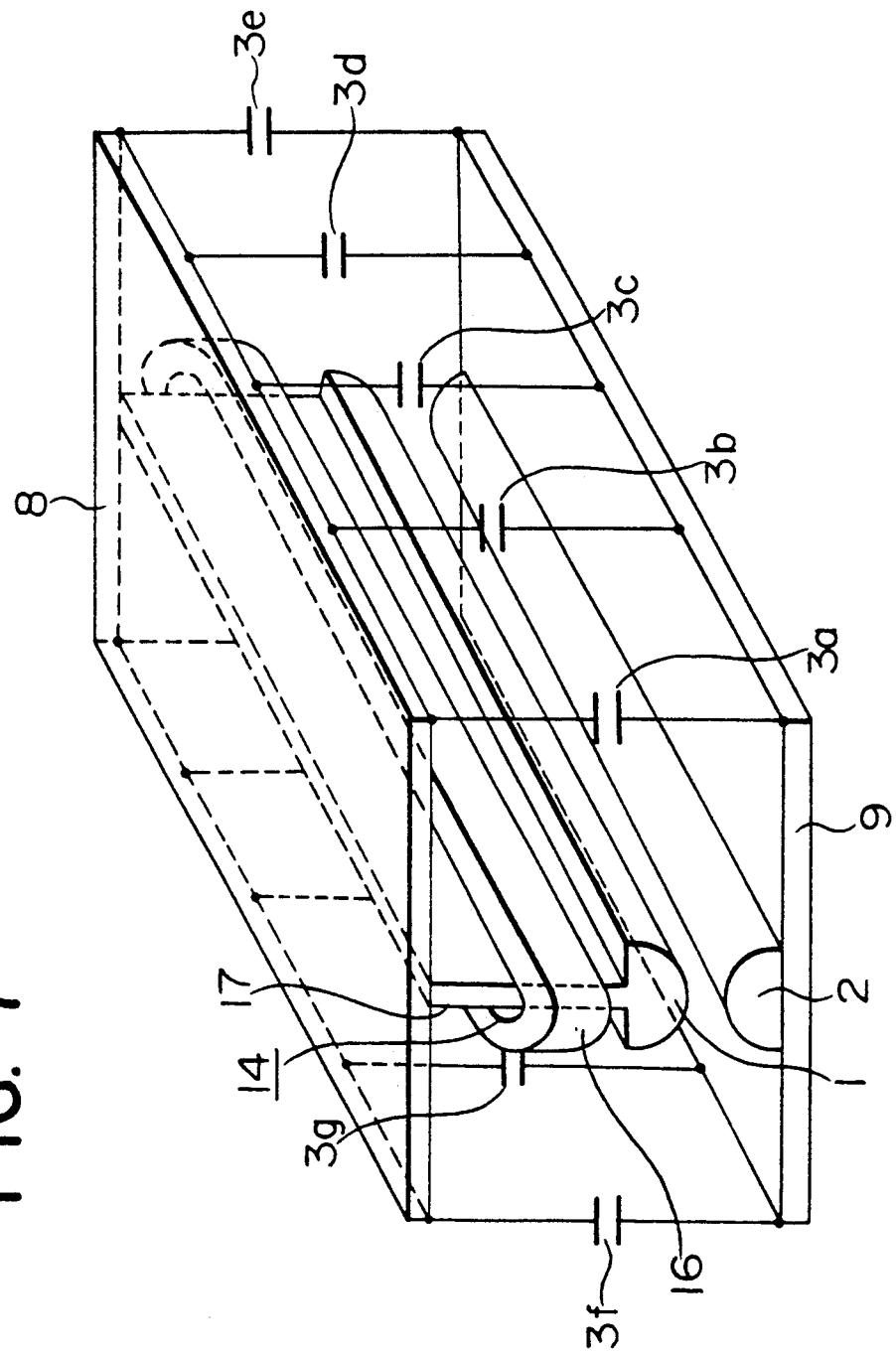

FIG. 7 is a three-dimensional circuit diagram showing part of FIG. 4a. A saturable reactor 14 consists of a running track-shaped core 16 and a conductor 17. The conductor 17 has a length almost the same as the longitudinal length of a main discharge electrode 1. In this embodiment, the core 16 has a multi-ply structure made by winding thin amorphous tape in the form of a running track.

Figure 8:
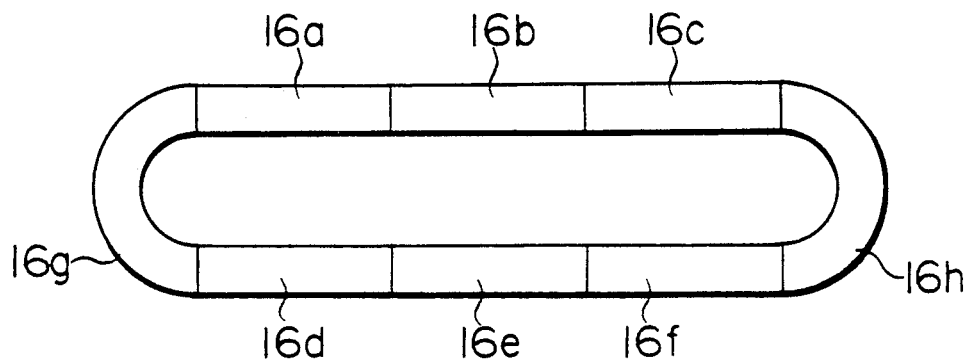

When the amorphous core 16 is employed, amorphous tape plies must be isolated one another or immersed in oil. To resolve this inconvenience, ferrite cores may be divided into portions, then arranged in the form of a running track as shown in FIG. 8. 16a, 16b, 16c, 16d, 16e, and 16f are linear ferrite cores, while 16g and 16h are ring ferrite cores. Ferrite has a smaller saturation flux density than amorphous. Therefore, a core made from ferrite must have a larger cross section. This increases a stray inductance 12, deteriorating laser oscillation efficiency. However, the running track-shaped ferrite core offers ease of operation.

Figure 9:
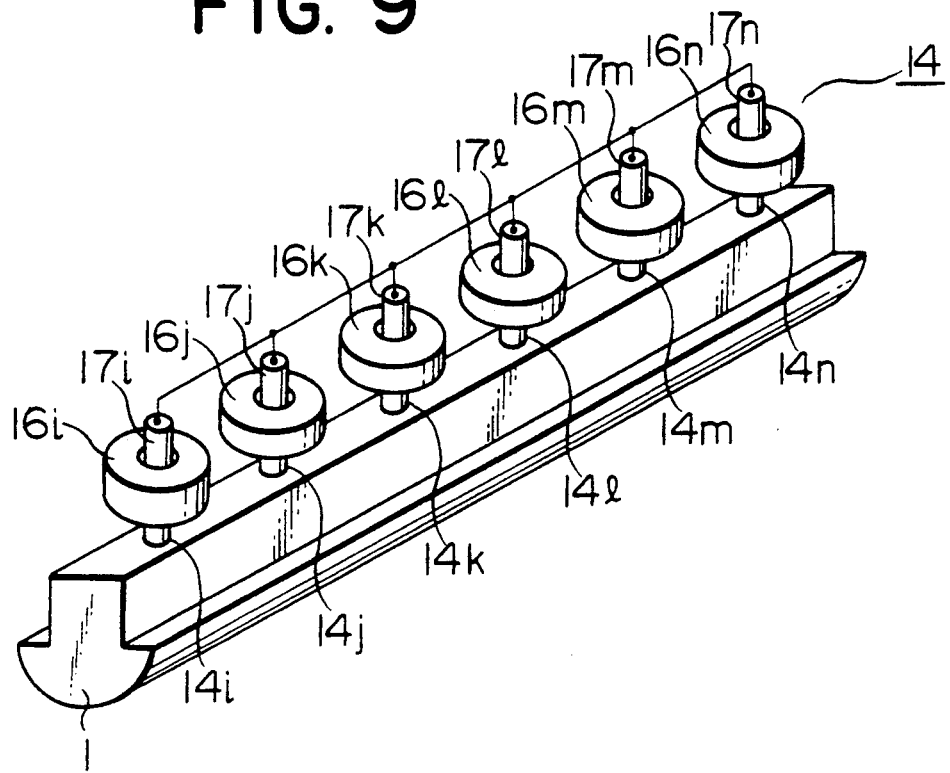
FIG. 9 is an oblique view showing other variant of the second embodiment.

FIG. 9 shows an arrangement of cores for reducing manufacturing cost. 16i to 16n are doughnut-shaped ferrite cores. 17i to 17n are conductors. For example, a ferrite core 16i and a conductor 17i are combined to form a saturable reactor 14i. 14j to 14n also denote similar saturable reactors, which are connected in parallel. Compared with a conductor 17 shown in FIG. 7, the conductors 17i to 17n connected in parallel shown in FIG. 9 provide a higher inductance. With the configuration of FIG. 9, a stray inductance 12 increases. This deteriorates laser oscillation efficiency. However, the doughnut-shaped ferrite cores 16i to 16n are available at reasonable prices.

Third Embodiment

Figure 10:
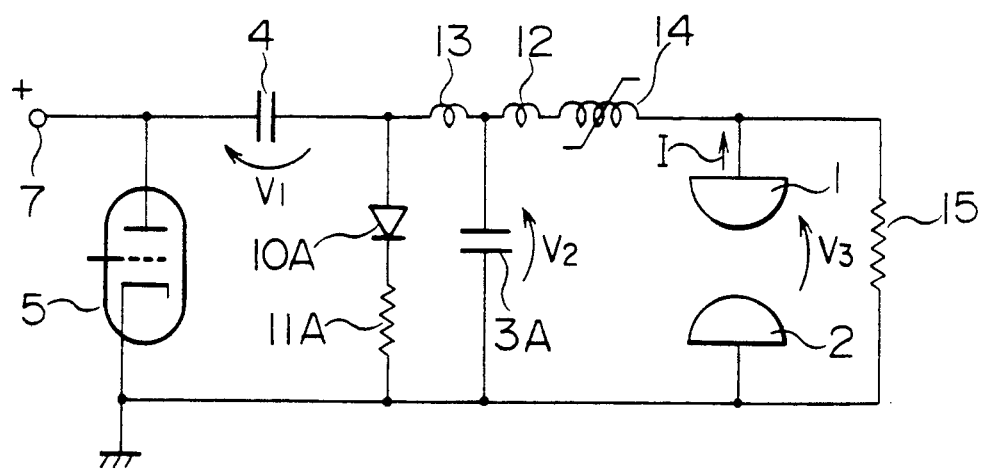
FIG.10 is a circuit diagram showing the third embodiment of the present invention.
Figure 12:
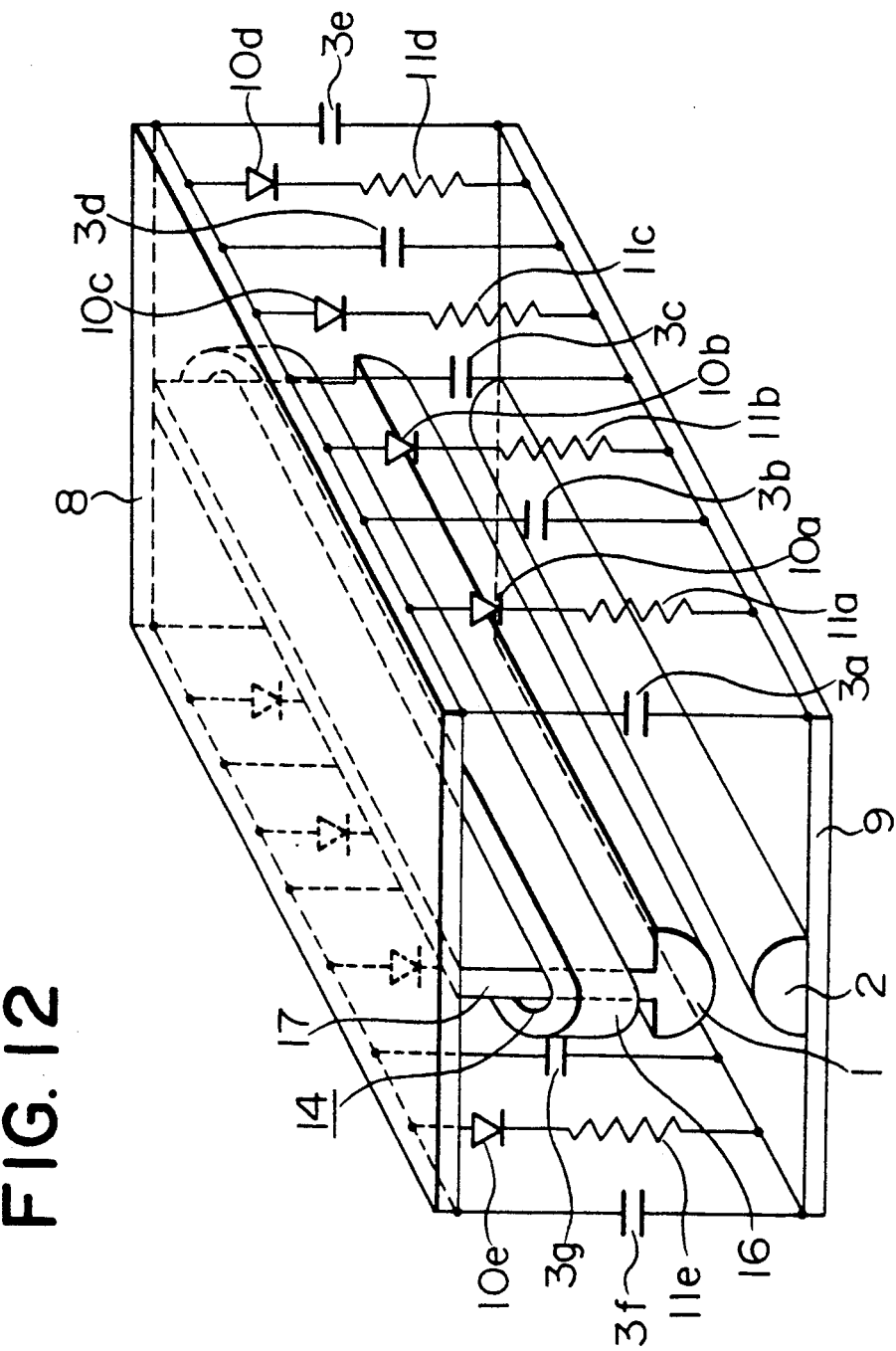
FIG. 12 is a three-dimensional circuit diagram showing part of the third embodiment.
Figure 13:
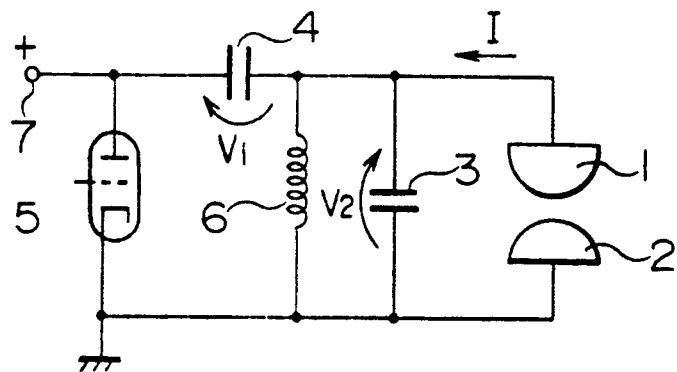
FIG. 13 is a circuit diagram showing a conventional pulsed laser.

FIG. 10 is a circuit diagram showing the third embodiment of the present invention. In the third embodiment, the first and second embodiments are implemented. FIG. 12 is a three-dimensional circuit diagram showing part of the third embodiment. As described previously, a diode 10A causes a response time lag. Therefore, reverse voltage developed in a peaking capacitor 3A cannot be removed completely. To prevent the reverse voltage developed in the peaking capacitor 3A from applying between main discharge electrodes 1 and 2, the cross-sectional area S of a saturable reactor 14 must be larger than the value determined by the formula (2). Therefore, a stray inductance 12 must always be increased with employment of the saturable reactor 14. This degrades laser oscillation efficiency.

Figure 11:
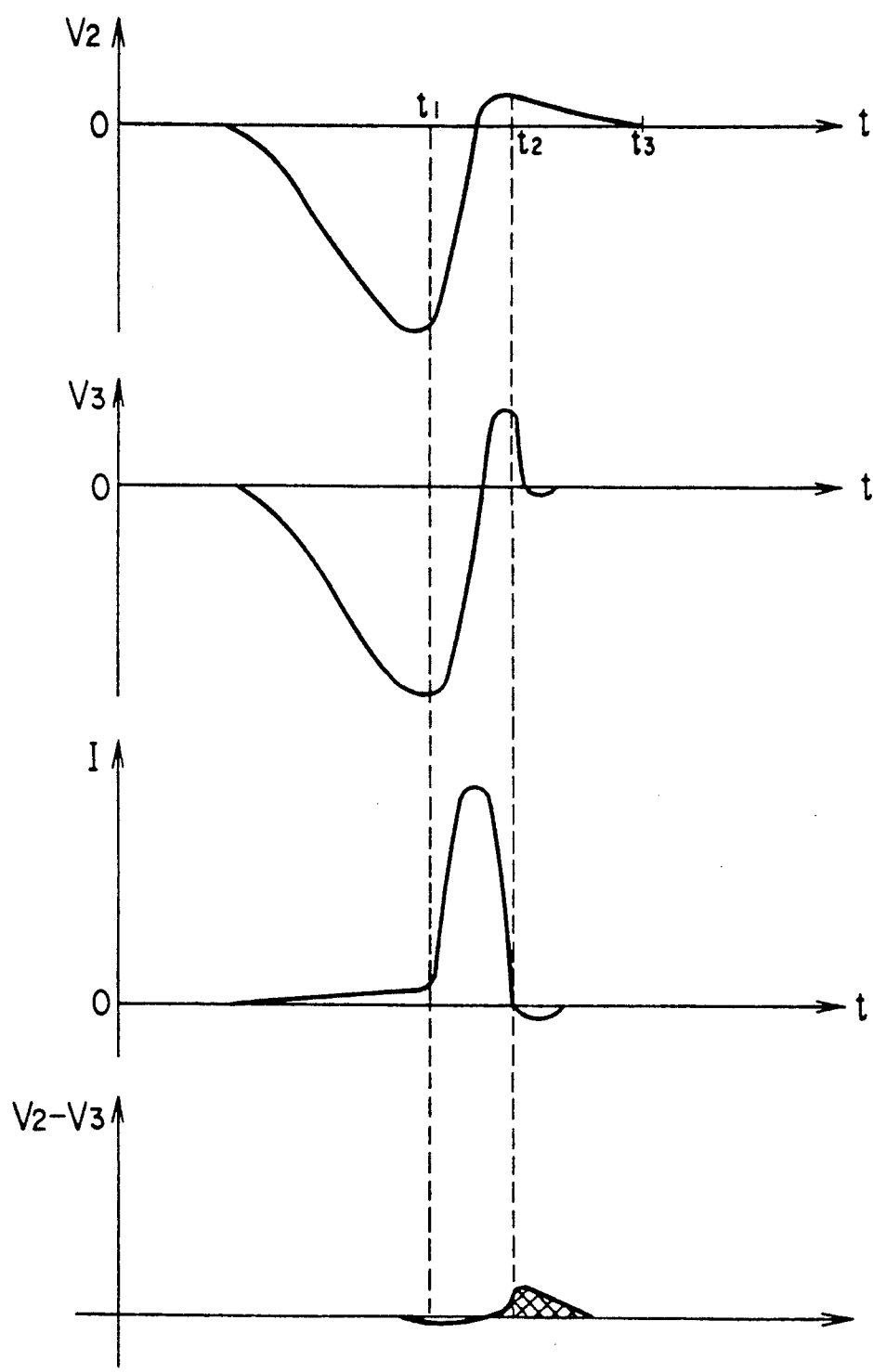
FIG. 11 shows signal waveforms representing the operations of the third embodiment.

In FIG. 10, the diode 10A and saturable reactor 14 are used in combination. This has the advantages below. The saturable reactor 14 blocks reverse voltage resulting from a response time lag caused by the diode 10A. Therefore, reverse current flowing between the main discharge electrodes 1 and 2 is suppressed to the level of leakage current of the saturable reactor 14. The diode 10A causes the peaking capacitor 3A to develop a lower reverse voltage. FIG. 11 shows waveforms representing voltage and current present in components in this stage. Compared with the waveforms in the second embodiment which does not include the diode 10A (FIG. 5), the $V_2$-$V_3$ value is apparently lower. This makes it possible to lessen the cross-sectional area S of the core of the saturable reactor 14, which is determined by the formula (2). Consequently, the stray inductance 12 can be reduced. As a result, the reverse current flowing between the main discharge electrodes 1 and 2 can be minimized without degrading laser oscillation efficiency remarkably. This configuration will prove more effective when the saturable reactor 14 is made from ferrite or other core material having a lower saturation flux density.

What is claimed is:

1. A pulsed laser comprising:
   mutually-opposing first and second main discharge electrodes;
   a plurality of peaking capacitors connected in parallel between said first and second main discharge electrodes; and
   a plurality of diodes connected in parallel with said plurality of peaking capacitors and oriented to suppress reverse-bias components of main discharge current flowing between said first and second main discharge electrodes.

2. A pulsed laser according to claim 1 wherein each of said first and second main discharge electrodes has a rod-like shape extending unidirectionally, and said plurality of peaking capacitors are arranged sporadically in the longitudinal directions of said first and second main discharge electrodes.

3. A pulsed laser according to claim 2 wherein said plurality of diodes are arranged sporadically in the longitudinal directions of said first and second main discharge electrodes.

4. A pulsed laser according to claim 1 further comprising a series combination of a pulse generating capacitor and a switch, said series combination being connected between said first and second main discharge electrodes.

5. A pulsed laser according to claim 4 wherein said plurality of diode are connected not to conduct charging currents of said plurality of peaking capacitors after said switch is turned on.

6. A pulsed laser according to claim 1 further comprising a plurality of resistors connected in series with said plurality of diodes.

7. A pulsed laser, comprising:
   mutually-opposing first and second main discharge electrodes;
   a saturable reactor connected to said first main discharge electrode at one end for suppressing reverse-bias components of main discharge current flowing between said first and second main discharge electrodes; and
   a plurality of peaking capacitors connected in parallel between an other end of said saturable reactor and said second main discharge electrode.

8. A pulsed laser according to claim 7 wherein each of said first and second main discharge electrodes has a rod-like shape extending unidirectionally, and said plurality of peaking capacitors are arranged sporadically in the longitudinal directions of said first and second main discharge electrodes.

9. A pulsed laser according to claim 8 wherein said plurality of diodes are arranged sporadically in the longitudinal directions of said first and second main discharge electrodes.

10. A pulsed laser according to claim 7 further comprising a series combination of a pulse generating capacitor and a switch, said series combination being connected between said first and second main discharge electrodes.

11. A pulsed laser according to claim 7 further comprising a stabilization circuit element connected between said first and second main discharge electrodes for stabilizing said saturable reactor.

12. A pulsed laser according to claim 11 wherein said stabilization circuit element is a resistor.

13. A pulsed laser according to claim 11 wherein said stabilization circuit element is a capacitor.

14. A pulsed laser according to claim 11 wherein said stabilization circuit element is a reactor.

15. A pulsed laser according to claim 7 wherein said saturable reactor includes a conductor plate connected to said first main discharge electrode and a running track-shaped core surrounding said conductor plate.

16. A pulsed laser according to claim 15 wherein said core has a multi-ply structure made by winding amorphous tape in the form of a ring.

17. A pulsed laser according to claim 15 wherein said core is made by combining a plurality of divided ferrite cores.

18. A pulsed laser according to claim 7 wherein said saturable reactor includes a plurality of conductor bars each connected to said first main discharge electrode and a plurality of ring ferrite cores surrounding their corresponding conductor bars.

19. A pulsed laser according to claim 7 further comprising a plurality of diodes connected in parallel with said plurality of peaking capacitors for suppressing reverse-bias components of main discharge current flowing between said first and second main discharge electrodes.

20. A pulsed laser according to claim 19 wherein said plurality of diodes are arranged sporadically in the longitudinal directions of said first and second main discharge electrodes.

21. A pulsed laser according to claim 19 further comprising a series combination of a pulse generating capacitor and a switch, said series combination being connected between said first and second main discharge electrodes, said plurality of diodes being connected not to conduct charging currents of said plurality of peaking capacitors after said switch is turned on.

22. A pulsed laser according to claim 19 further comprising a plurality of resistors connected in series with said plurality of diodes.

* * * * *